US005145292A

United States Patent [19]

Bulso, Jr. et al.

[11] Patent Number: 5,145,292

[45] Date of Patent: Sep. 8, 1992

[54] AIR CONVEYING SYSTEM

[75] Inventors: Joseph D. Bulso, Jr., Canton; James A. McClung, North Canton; Alexander P. Dottavio, Canton, all of Ohio

[73] Assignee: Redicon Corporation, Canton, Ohio

[21] Appl. No.: 663,558

[22] Filed: Mar. 4, 1991

[51] Int. Cl.[5] .......... B65G 51/03

[52] U.S. Cl. .......... 406/88; 406/31

[58] Field of Search .......... 406/86, 88, 108, 194, 406/19, 31

[56] References Cited

U.S. PATENT DOCUMENTS

| | | | |
|---|---|---|---|
| 3,231,065 | 1/1966 | Kaminski et al. | 198/803.15 |
| 3,812,953 | 5/1974 | Maschke | 198/803.15 |
| 4,185,783 | 1/1980 | Lacchia | 406/86 X |
| 4,289,231 | 9/1981 | Kaminski | 198/834 |
| 4,483,172 | 11/1984 | Bulso, Jr. et al. | 72/349 |
| 4,588,066 | 5/1986 | Kaminski | 198/346.2 |
| 4,710,068 | 12/1987 | Lindstrom et al. | 406/88 |
| 4,741,196 | 5/1988 | Stewart et al. | 72/427 |
| 4,881,397 | 11/1989 | Stewart et al. | 72/361 |
| 4,903,521 | 2/1990 | Bulso, Jr. et al. | 72/336 |
| 5,017,052 | 5/1991 | Bartylla | 406/86 X |

FOREIGN PATENT DOCUMENTS

| | | | |
|---|---|---|---|
| 575298 | 10/1977 | U.S.S.R. | 406/88 |
| 1277194 | 6/1972 | United Kingdom | 406/88 |

*Primary Examiner*—Russell D. Stormer
*Assistant Examiner*—Andrew C. Pike
*Attorney, Agent, or Firm*—Reese Taylor

[57] ABSTRACT

A conveyor assembly includes a conveying surface and at least one air manifold for directing air against the sidewall of the articles to be conveyed. The conveying surface includes longitudinally extending raised ribs along which the articles are moved and the air manifolds are connected directly to the source of air. Further, the conveyor assembly is attached directly to a die member and becomes an integral part thereof.

5 Claims, 2 Drawing Sheets

AIR CONVEYING SYSTEM

RELATED PATENT APPLICATIONS

None.

BACKGROUND OF THE INVENTION

This invention relates in general to means for conveying objects from an object discharge point to a transfer point and relates in particular to a system for conveying small objects by directing a flow of air against the side of the object and moving it along a conveying surface.

DESCRIPTION OF THE PRIOR ART

It will first be noted that the present invention will be described in the context of the can-making industry and particularly in the context of cupping means utilized in the can-making industry to produce two-piece cans. It should also be noted, however, that the inventive concept and the structure disclosed herein would obviously be capable of being utilized to convey virtually any object and is not intended to be solely limited to a particular industry.

With that in mind, in the can-making industry, it is common to form a blank from a flat piece of stock, supplied in sheet or coil form, and to then draw the blank to form a "cup" which is simply an unfinished cylindrical object having a bottom and sidewall. The cup thus formed is then passed, in some instances, to other stations within the press and, in other instances, to other presses for further operations, such as redrawing, bottom profiling, curling, etc. All of these operations are generally well-known in the can-making industry.

It has also become known to provide cuppers wherein the cups are passed through the die as they are formed and then moved out from beneath the die for further operations at other stations in the same press or in other presses. Examples of "through the die" forming can be seen in Bulso et al. U.S. Pat. Nos. 4,483,172 and 4,903,521. Generally, in the piror art, movement of the article from beneath the die has been accomplished in a number of ways. One way is to provide mechanical transfer means to grasp the cups and move them along. While these systems do work, it is noted that, with the constant down-gauging of material for economic reasons, the cups become more and more fragile and, therefore, it is generally inadvisable to handle them mechanically any more frequently than it is absolutely necessary. Furthermore, mechanical transfer means tend to limit the speed of operation since the press can be run only as rapidly as the transfer means can operate.

Another method of transfer in a through the die operation is to deposit the cups onto a moving, endless belt-type conveyor or into pockets in such a conveyor which then moves them away from their point of deposit. Examples of belt-type conveyors of this general type may be seen in Kaminski et al. U.S. Pat. No. 3,231,065; Maschke U.S. Pat. No. 3,812,953; Kaminski U.S. Pat. No. 4,289,231; and Kaminski U.S. Pat. No. 4,588,066. The difficulty again is, however, that, along with the constant down-gauging of the material, increase in speed also becomes more and more desirable. Necessarily, of course, a belt transfer restricts the operational speed of the press and, therefore, its productive output to the speed with which the belts can remove the product. Furthermore, belt conveyors require frequent tension adjustment and, since they rely on friction between the object and the belt surface, are often subject to slippage and jams.

Therefore, in addition to the just discussed systems, there have been attempts to move objects of this type by utilization of air conveyors.

For example, Lindstrom et al. U.S. Pat. No. 4,710,068 provides such a means whereby a conveying surface is provided with a plurality of air jets in fluid flow relation with a plenum and an air accelerator hood is provided adjacent the discharge point of the articles onto the conveying surface. In this concept, a plenum is provided adjacent the transfer point, and the air is forced into the plenum, which is disposed beneath the conveying surface and at the conveyor discharge end, and then through the air acceleration hood and against the article which is then pushed along toward the conveyor discharge end or transfer point. The air jets in the base of the conveyor are utilized to reduce friction and assist in moving the objects along the conveyor surface.

Other examples of such air conveying systems can be seen also in Stewart et al. U.S. Pat. Nos. 4,881,397 and 4,741,196 wherein the air jets are eliminated, but the basic concept of utilizing the air plenum is continued.

Thus, this approach is quite similar to that of Lindstrom in that air is introduced into a plenum running beneath the conveying surface, passes under the conveying surface and up through an air-directing hood, whereupon the air is directed back along the same path it has just followed, but on the top of the conveying surface so as to move the articles along it.

Certain difficulties, however, have been found with regard to even these air conveying systems. Specifically, with larger and heavier objects, the systems just described appear to not be capable of effectively moving the objects. It is not known precisely why this occurs, but even if the conveying systems are beefed up and enlarged in every way, sufficient force can still not be applied to the wall of the article to move the articles with sufficient speed to avoid adversely limiting the operational speed of the press. Furthermore, the utilization of the air plenum beneath the conveying surface increases the overall size, weight, and cost of such systems which are commonly installed beneath the die in a relatively restricted space.

Further in that regard, since these conveying systems are often utilized with metal forming dies in a reciprocating press and the dies, in many applications, are changed quite frequently, either due to wear or to changing production requirements, it is, therefore, desirable to produce a conveying system which is capable of easy and ready change along with the die.

SUMMARY OF THE INVENTION

It, accordingly, becomes the principal object of this invention to provide an air conveying system which is capable of rapidly moving even relatively heavy articles, yet which is compact so as to facilitate location and installation in a press and economical and relatively simple in construction.

In accordance with this principal object, it has been found that such a conveying system can be produced without the previously known plenum and comprising a support plate disposed beneath the object discharge point for receipt of the objects to be conveyed and one or more air-directing nozzles adjacent the point of discharge of the object onto the conveying system, thereby achieving improved conveying properties.

It has further been found that this can be accomplished without the utilization of an air plenum with the air-directing nozzles being directly connected to the air source, thereby reducing the overall size of the conveying system.

It has further been found that sensing means can be adjustably mounted on the conveyor system adjacent the point on which the objects are deposited on the conveying surface so that the presence of jams can be readily detected.

It has also been discovered that movement of the objects along the conveying surface can be facilitated by the utilization of longitudinally extending, raised ribs on the conveying surface, extending from the point of discharge onto the surface to the transfer or conveyor discharge point so as to reduce friction as the objects are blown along the conveying surface.

Finally, it has been found that economies in operation can be achieved by providing the conveying system as an integral part of the lower die member, so that when the die is changed, the conveyer automatically is changed with it, and the separate assembly of the die and conveyor is not required each time the die is changed.

Accordingly, production of an improved air conveying system of the type above-described becomes the principal object of this invention with other objects thereof becoming more apparent upon a reading of the following brief specification considered and interpreted in view of the accompanying drawings.

DESCRIPTION OF THE EMBODIMENTS OF THE INVENTION

Figure 1:
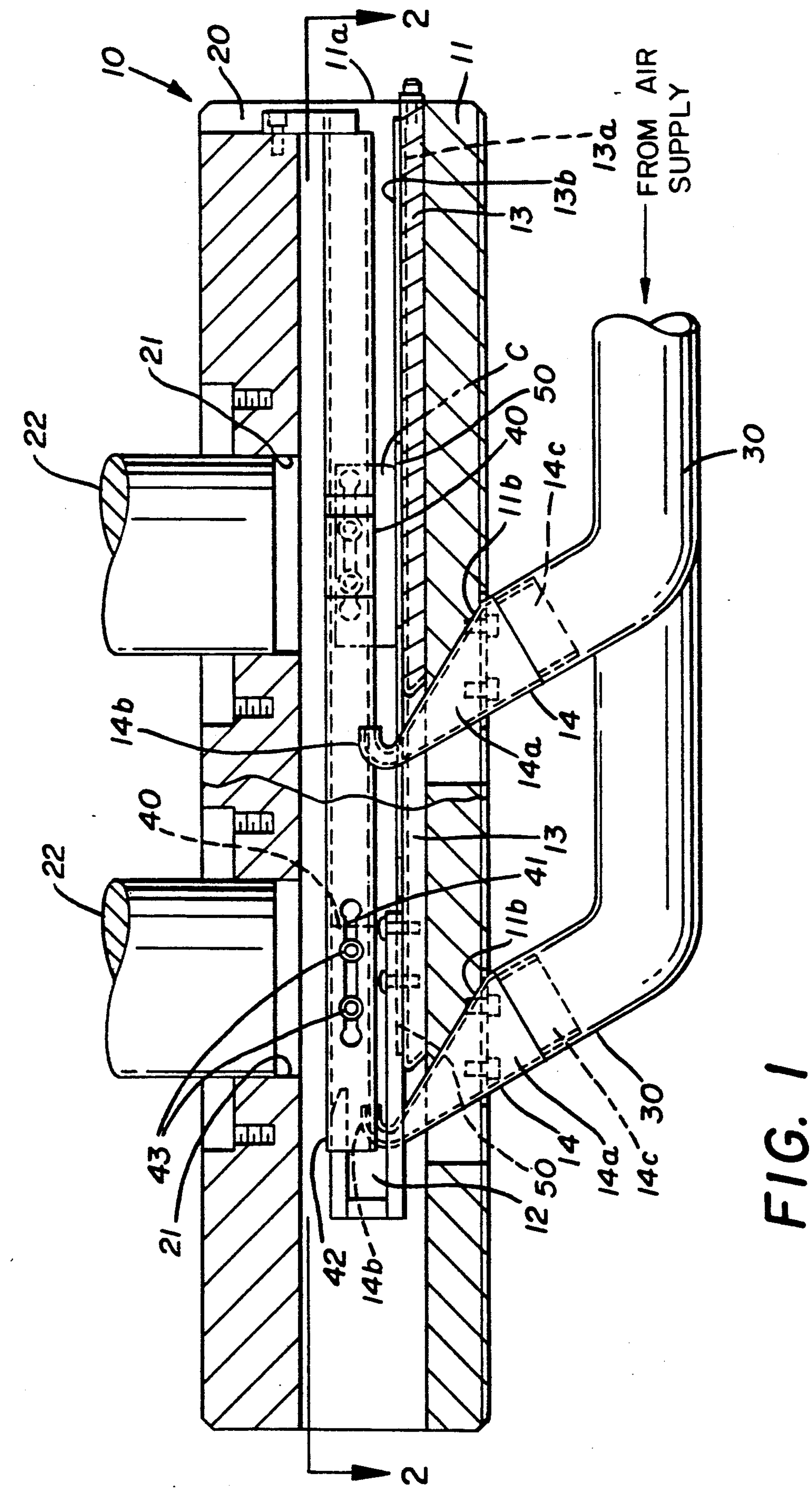
FIG. 1 is an elevational view of the improved conveying system taken along the line 1—1 of FIG. 2.
Figure 2:
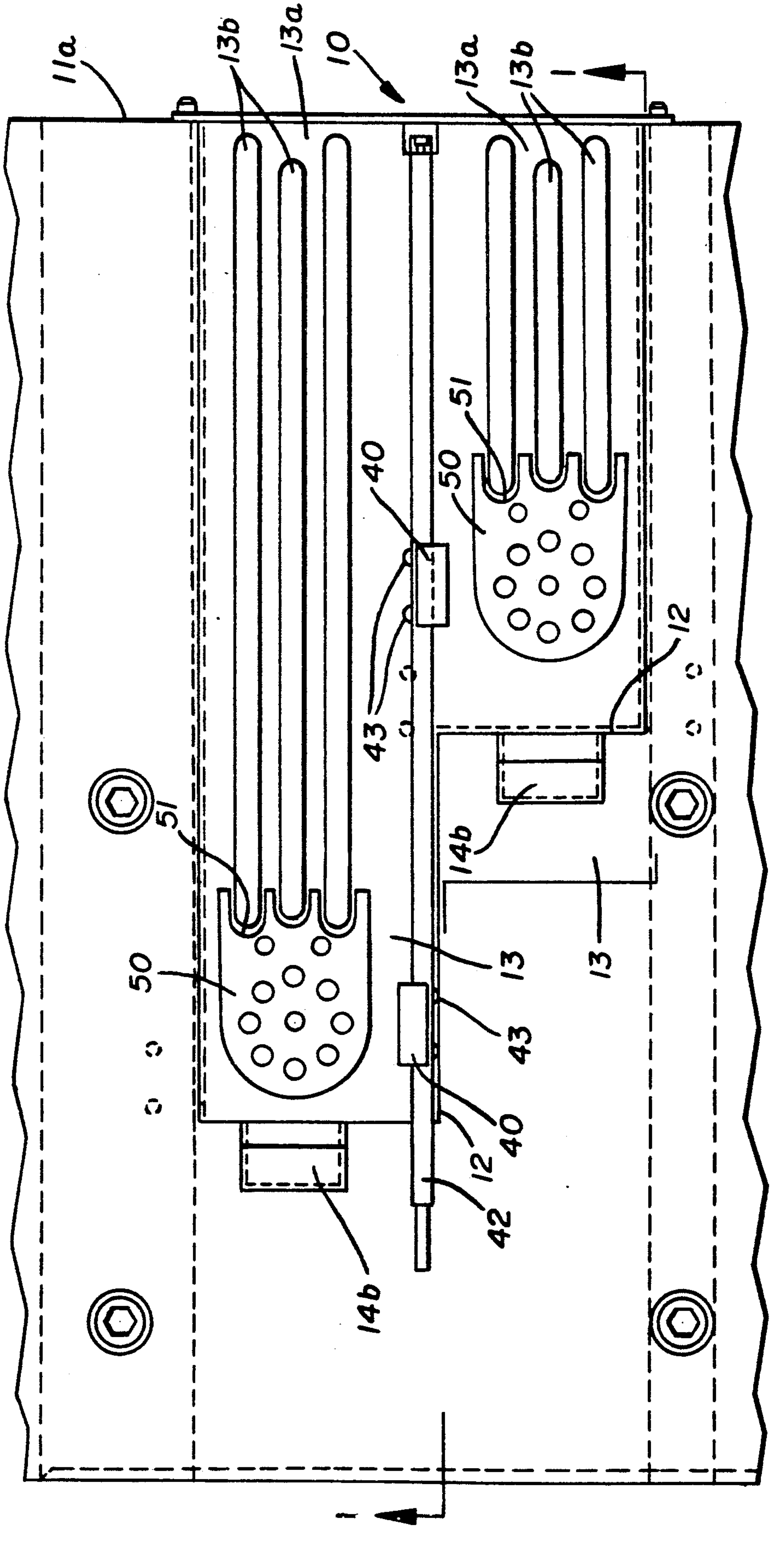
FIG. 2 is a plan view taken along the line 2—2 of FIG. 1, partially in section and with the cups not shown for clarity of illustration of other elements of the system.

Referring to FIGS. 1 and 2 of the drawings, it will be seen that the conveyor assembly is generally indicated by the numeral 10 and the lower die member is generally indicated by the numeral 20.

In that regard, it will be noted that the invention is illustrated and will be described in connection with a forming press which carries upper and lower die members with the upper die member being reciprocal with respect to the lower. In that way, one or more articles, such as cups, can be formed during each press cycle. Further, the arrangement illustrated is a "through the die arrangement" wherein the material is inserted into the press between the upper and lower die members and the formed article is ejected through the lower die member.

Such presses and die arrangements are well known in diverse arts and will not be further described herein. Furthermore, only so much of the environmental structure as is necessary to describe and understand the present invention will be illustrated.

With that in mind, it will be seen that the lower die member 20 has one or more die openings 21 through which the cups C are deposited on the conveyor following forming. Two such openings 21 are illustrated, but it will be readily understood that more or less may be utilized. Forming tools 22,22, carried by the upper press ram, reciprocate with respect to the lower die member 20 to form the cups C, passing them through the die openings 21,21 on the conveying surface at what will be referred to herein as the object discharge point.

The conveyor assembly 10 includes a main body 11 which is intended to be secured to the lower die member 20 in suitable fashion so that it underlies the lower surface of the lower die member and forms an assembly therewith.

Main body 11 of conveyor assembly 10 has one or more elongate openings 12,12 opening from end **11*a* and extending inwardly therefrom to terminate at a point generally beneath openings 21,21 in the lower die member 20. The number of such openings 12 will correspond to the number of the openings 21 in lower die member 20**.

Positioned in each of the elongate openings 12,12 is a substantially imperforate elongate conveyor support member 13. These support members 13,13 extend beneath their respective openings 21 and their top surfaces **13*a* provide the main conveying surface for the cups C. To that end, a support pad 50 is affixed to each top surface 13*a* beneath each opening 21 to cushion the fall of cup C and facilitate initial internal movement thereof. Pads 50,50** are preferably fabricated of nylon or a similar material having a low coefficient of friction for this purpose.

Also, as can be seen from the drawings, each support member 13 includes one or more elongate, longitudinally extending, raised ribs **13*b* which, as shown in FIG. 2 of the drawings, extend from a point adjacent the arcuate notches 51 in each pad 50 adjacent the object discharge openings 21 to the end 11*a* of the body 11**.

It is contemplated that the cups C, after leaving pads 50,50 will ride along these ribs **13*b*,13*b* thereby reducing friction and facilitating movement along top surfaces 13*a*,13*a***.

Still referring to FIGS. 1 and 2 of the drawings, it will be noted that a sensor 40 is mounted adjacent each object discharge point and, by virtue of the slot 41 in the sensor mounting plate 42 and screws 43, 43, these sensors are adjustable so as to accommodate different sized objects. The purpose of the sensors is to sense whether an object has jammed at the object discharge point.

The conveyor assembly 10, as previously noted, includes support members 13,13 and the ribs **13*b*,13*b* and sensors 40,40. It also includes what may be called air manifolds 14,14. These manifolds each have an elongate body 14*a* terminating at one end in a curved discharge nozzle 14*b* and at the other end in a reduced diameter area 14*c*. This reduced diameter portion receives the hose 30** which leads to the air supply source (not shown).

In order to mount the air manifolds 14,14, the main body 11 has appropriate angularly directed bores **11*b*,11*b* which are located so that the discharge nozzles 14*b*,14*b* are positioned just to the left of discharge points 21 and just past the inboard ends of conveyor support members 13,13**, as can be seen in FIG. 2 of the drawings.

It is readily apparent from the foregoing description that operation of the device includes operation of the press itself and the tooling which will form the cups C and pass them through the apertures 21,21 of the lower die member 20. They will then be received on pads 50,50 of the conveyor support plate 13, and air will be directed against the walls of the objects through air manifolds 14,14, forcing the objects along the support pads 50,50 and then along the ribs 13*b*,13*b* toward the transfer point at end 11*a*.

It will be noted that, by virtue of the fact that the main conveyor body 11 is secured directly to the lower die member 20, it will be apparent that removing the lower die member 20 from the press will also result in removing the conveyor assembly 10, and the conveyor and the die will form a sub-assembly of the overall press. Therefore, when it is desired to change dies, either because the die has become worn or because a different size object is to be formed, it is simply necessary to remove the entire sub-assembly and substitute a new one. This saves costly personnel time at the job site and insures also that the conveyor is properly positioned relative to apertures 21,21, etc. It has been found that, in practice, the normal time for changing a die with a conventional conveyor can be reduced by about seventy-five percent (75%) with such an arrangement.

It will thus be seen that a compact and economical conveying system has been provided and it has been found that significant improvement in the efficiency with which articles can be quickly moved has been achieved.

While a full and complete description of the invention has been set forth in accordance with the dictates of the Patent Statutes, it should be understood that modifications can be resorted to without departing from the spirit hereof or the scope of the appended claims.

In that regard, as previously noted, the invention has essentially been described in connection with the forming of cups as part of the overall process of forming two-piece cans. However, it will be readily apparent that in utilization it need not be limited to that particular field.

Furthermore, the invention has been illustrated in a "two out" situation in which the lower die member 20 contains two forming apertures so that, upon each press cycle, two cups will be formed. The nozzles and ribs, etc., are, of course, two in number also. However, it will again be readily apparent that the invention need not be so limited.

What is claimed is:

1. A conveyor assembly secured to a lower die member of a forming press for moving objects from an object discharge point in the lower die member to a transfer point by air from an air supply source, the conveyor assembly comprising:

a) a substantially imperforate support plate disposed beneath the object discharge point and extending toward the transfer point; and
b) at least one air directing nozzle
   1) connected to the air supply source and
   2) projecting above said support plate adjacent the object discharge point and
   3) directed toward the transfer point to direct air from the air supply source along said support plate;
c) wherein said support plate has at least one longitudinally extending, raised rib extending from adjacent the object discharge point toward the transfer point.

2. The conveyor assembly of claim 1 wherein at least one adjustably mounted sensor is disposed adjacent the object discharge point.

3. The conveyor assembly of claim 1 wherein a plurality of said raised ribs are provided.

4. The conveyor assembly of claim 1 wherein said air directing nozzle includes a body portion extending through said support plate and terminating in a curved end disposed above said support plate and opening toward the transfer point.

5. The conveyor assembly of claim 1 wherein an imperforate article receiving pad having a low coefficient of friction is disposed beneath each object discharge point.

* * * * *